United States Patent [19]

Savoia

[11] Patent Number: 5,209,502
[45] Date of Patent: May 11, 1993

[54] DUAL LIP SEAL AND METHOD OF FORMING THE SEAL

[75] Inventor: Michael A. Savoia, Manchester, Mich.

[73] Assignee: Mather Seal Company, Southfield, Mich.

[21] Appl. No.: 903,019

[22] Filed: Jun. 23, 1992

[51] Int. Cl.$^5$ ............................................. F16T 15/32
[52] U.S. Cl. .................................... 277/152; 277/35; 277/178
[58] Field of Search .............. 277/35, 50, 152, 153, 277/165, 178, 181, 188 R

[56] References Cited

U.S. PATENT DOCUMENTS

| 2,979,345 | 4/1961 | Potter | 277/152 |
| 4,522,411 | 6/1985 | Burgan | 277/153 |
| 4,623,153 | 11/1986 | Nagasawa | 277/153 |
| 4,822,059 | 4/1989 | Shimasaki et al. | 277/152 |
| 4,834,397 | 5/1989 | Shimasaki et al. | 277/152 |
| 4,943,068 | 7/1990 | Hatch et al. | 277/152 |

FOREIGN PATENT DOCUMENTS 2102084  1/1983  United Kingdom ............... 277/152

*Primary Examiner*—William A. Cuchlinski, Jr.
*Assistant Examiner*—Daniel G. DePumpo
*Attorney, Agent, or Firm*—Lawrence J. Shurupoff

[57] ABSTRACT

A dual lip shaft seal includes two sealing disks bonded directly to a radial wall of an annular metal case. The radial wall has an annular step, such that two separate mounting surfaces are formed for mounting the two disks. Each sealing disk is preferably formed of PTFE and heat-bonded to its respective mounting surface by an induction heater coil disposed in confronting relation to the radial wall of the metal case.

6 Claims, 2 Drawing Sheets

DUAL LIP SEAL AND METHOD OF FORMING THE SEAL

BACKGROUND OF THE INVENTION

1. Field of the Invention

This invention relates in general to shaft seals of the dual lip radial type and in particular to a shaft seal having a first annular sealing disk engageable with a shaft surface for sealing and retaining lubricant and a second annular sealing disk for preventing dirt and other contaminants from migrating along the shaft surface to the first sealing disk and into the lubricant.

2. Description of Prior Developments

Dual lip radial seals are well known in the art. In one known arrangement, such a seal includes an outer metal case having a cylindrical wall and a radial wall. An annular gasket is seated on the radial wall for engagement with a dirt excluder lip or disk. A second seal disk or lip is clamped against the dirt excluder disk by an inner metal case that is nested within the outer metal case. The inner metal case has a radial wall for applying a squeezing pressure on the second seal disk such that the two disks are mechanically retained in the metal case structure.

The two disks may be formed of polytetrafluoroethylene (PTFE). An advantage of this design is that one disk may be filled with one type of filler material such as glass for abrasion resistance, and the other disk may be filled with another type of filler material such as molybdenum disulphide for reducing running friction. A drawback associated with this design is its relatively high cost due to its numerous components and involved manufacturing method.

In another known arrangement, a relatively thick PTFE disk is bonded to an inwardly radiating wall portion of a metal case. The relatively thick disk has a radial slit extending from its inner edge partway toward its outer edge, such that two annular sealing disks or lips are formed by a single slit disk. The sealing disks are arranged in opposite axial directions on a shaft surface, whereby one of the sealing disks constitutes a dirt excluder seal and the other disk constitutes an oil seal. An advantage of this design is its low cost due to its simplicity of design and ease of manufacture. However, it is most difficult to provide separate fillers in the two seal lips in an economical fashion.

Accordingly, a need exists for a dual lip seal which incorporates the low cost advantage of the bonded lip design of FIG. 2 with the material and filler selectivity of the clamped lip design of FIG. 1. As can be seen in FIG. 2, two separate seal disks cannot be bonded to the radial flange 15 because once the first disk is bonded to flange 15 the first disk covers the metal bonding surface thereby preventing the bonding of a second disk to flange 15.

SUMMARY OF THE INVENTION

The present invention has been developed to fulfill the needs noted above and has as a primary object the provision of a dual lip shaft seal that includes a metal case having a radial wall that is formed with an annular axial step between its inner and outer edges. The step configuration enables the radial wall to have inner and outer mounting and sealing surfaces located in different radial planes.

An individual annular dirt excluder disk is bonded to the inner mounting and sealing surface and a separate annular oil seal disk is bonded to the outer mounting and sealing surface of the radial wall. The two disks are individually bonded to the radial wall of the metal case, preferably by heating and fusing the disk material to the respective metal mounting and sealing surfaces.

Preferably, the two sealing disks are formed of PTFE having different filler materials related to the different functions of the different disks. The dirt excluder disk may include finely dispersed glass fibers to give the disk good abrasion resistance. The primary seal disk may include minor quantities of finely dispersed glass fibers and dry lubricant particles, such as graphite or molybdenum disulfide, to give the disk good wear resistance.

A major feature of the invention is the use of a metal case having a radial wall that is formed with an annular axial step. Individual PTFE sealing disks can be placed on the different step surfaces and simultaneously bonded to the metal case by the process of heating the metal case, preferably with an induction heater. The PTFE disks can have different finely divided fillers for providing abrasion resistance, wear resistance, flexibility or lubricity and can be mounted to the seal casing using an economical bonding method.

DETAILED DESCRIPTION OF THE PREFERRED EMBODIMENTS

Figure 1:
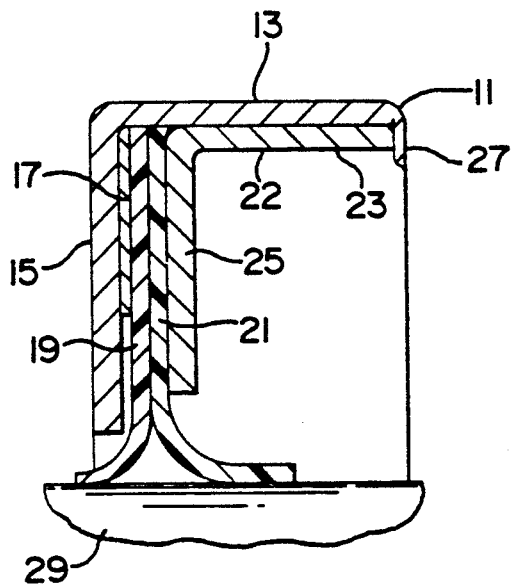
FIG. 1 is a fragmentary sectional view taken through a dual lip seal constructed according to the teachings of the prior art.

FIG. 1 illustrates a prior art dual lip seal that includes an outer metal case 11 having a cylindrical axial wall 13 and a radial wall 15. An annular gasket 17 is positioned against radial wall 15 to form a sealing surface for a first sealing disk 19. A second sealing disk 21 is forced against the other face of disk 19 by an inner metal case 22.

Case 22 includes a cylindrical wall 23 nested within wall 13 and a radial wall 25 seated against the right face of sealing disk 21. The right end portion of cylindrical wall 13 is turned inwardly, as at 27, to force case 21 leftwardly so that the two sealing disks 19 and 21 are mechanically clamped between gasket 17 and radial wall 25.

In the arrangement of FIG. 1, the sealing disk 21 can engage the surface of a rotary shaft 29 to act as an oil seal, whereby lubricant is retained in a bearing located to the right of case 11. The leftmost sealing disk 19 can act as a dirt excluding seal for preventing dirt migration into the bearing lubricant. Both disks can be formed of PTFE, but with different fillers, if desired.

Figure 2:
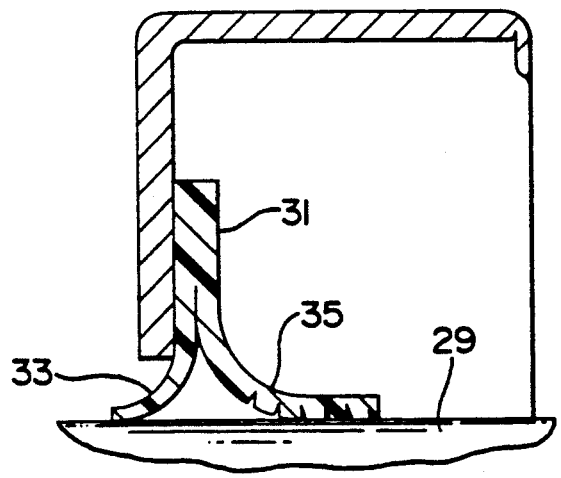
FIG. 2 is a fragmentary sectional view taken through another prior art lip seal.

FIG. 2 shows another prior art dual lip seal. A metal case 11 has a radial wall 15 that seats a one-piece disk structure 31, preferably formed of PTFE. The disk structure may be bonded to wall 15 by heating the case radial wall 15 to a temperature higher than the gel temperature of the PTFE disk material, i.e. higher than 621° F.

Disk structure 31 is slit along its mid-plane from its inner edge partway toward its outer edge, so that two separate annular lips 3 and 35 are formed from a single disk structure. As shown in FIG. 2, the two lips are turned in opposite directions to engage the surface of shaft 29 at spaced points along the shaft. Lip 33 may serve as a secondary dirt excluding seal, whereas lip 35 may serve as a primary lubricant containment seal.

Figure 3:
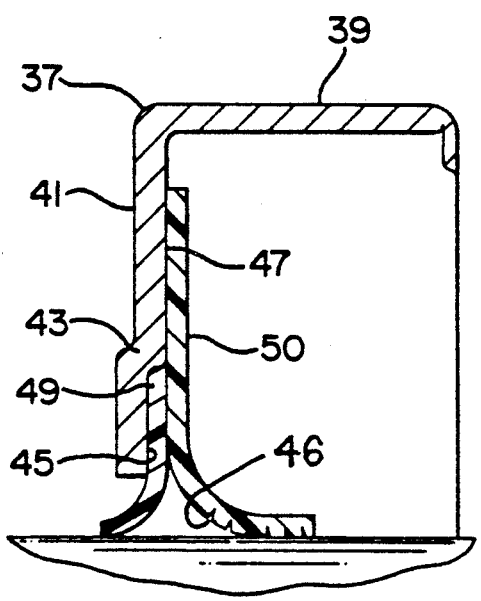
FIG. 3 is a fragmentary sectional view through a dual lip seal of the present invention.

FIG. 3 illustrates one embodiment of the present invention. A metal case 37 includes a cylindrical axial wall 39 and a radial wall 41. Wall 41 is axially stepped or axially offset, as shown at 43, to form two separate radially-extending annular sealing surfaces 45 and 47. The plane of the inner sealing surface 45 is axially offset slightly to the left of the plane of the outer sealing surface 47, so that two separate sealing disks or sealing surfaces can be positioned against the respective sealing surfaces without either disk interfering with the bonding of the other disk to radial wall 41.

A relatively small diameter annular sealing disk 49 is bonded to surface 45, whereas a larger diameter annular sealing disk 50 is bonded to surface 47. Both disks are preferably formed of PTFE, however, the different disks can have different finely dispersed fillers. Disk 45 can have small amounts of glass fibers and dry lubricant particles dispersed therein. Such dry lubricant particles can include graphite or molybdenum disulfide. Disk 47 can be compounded with glass fibers for enhancement of its abrasion resistance. Disk 45 can act as a lubricant-containment seal element, whereas disk 47 can serve as a dirt excluder seal.

The dual lip seal of FIG. 3 functions in essentially the same fashion as the dual lip seal of FIG. 2 except that, since disks 45 and 47 are separately formed, they can have different properties suited to their different functions and requirements. The operating or shaft-engaging face of sealing disk 45 can have a spiral groove 46 therein for returning any escaping lubricant back to the zone to the right of disk 45.

Figure 4:
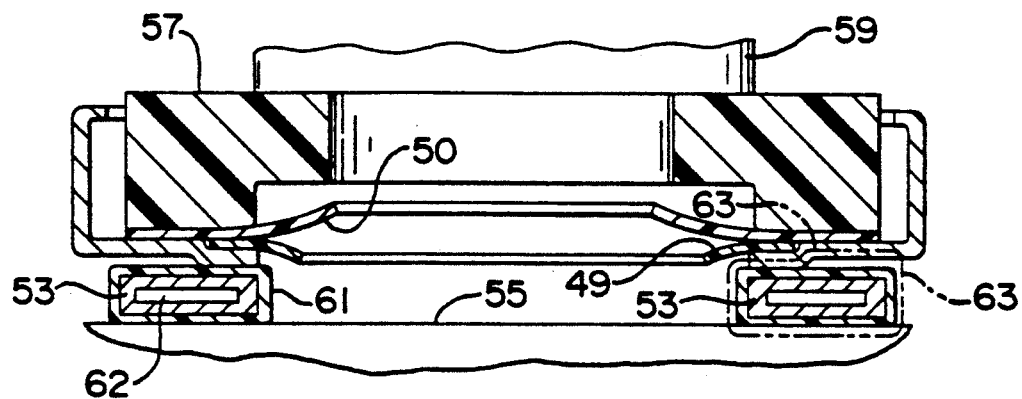
FIG. 4 is a view showing an apparatus for achieving a bond between the sealing disks and the metal case in the FIG. 3 seal assembly.

As noted above, each PTFE disk is bonded directly to one of the stepped sealing surfaces 45 or 47 formed on metal wall 41. FIG. 4 shows a preferred mechanism for accomplishing the bonding operation. An induction heater coil 53 is positioned on a non-metallic support surface 55 to engage the radial wall 41 of metal case 37.

Co-pending patent application, Ser. No. 741,929, filed Aug. 8, 1991, describes in some detail various bonding agents and the general bonding method that can be used. Suitable bonding agents include fluorinated ethylene propylene as well as other fluorocarbons. The bonding agent can be applied as a spray in a solvent or carrier dispersion. After the solvent has been volatilized and the bonding agent has adhered to the metal surface as a thin dry film, the PTFE disks 49 and 50 are placed within case 37 as shown in FIG. 4.

In order to achieve a good adhesive bond between the PTFE disks and the metal sealing surfaces, the disk surfaces should be in pressure contact with the metal surfaces that have been coated with the bonding agent. As shown in FIG. 4, a non-metallic pressure pad 57 is carried on the piston rod 59 of a fluid cylinder, not shown, whereby a pressure force can be simultaneously applied to disks 49 and 50. Energization of the fluid cylinder causes pad 57 to apply a downward force on the two plastic disks.

In order that each disk will have pressure contact with their respective metal mounting surfaces 45, 47, annular step 43 has approximately the same axial dimension as the thickness of disk 47. Each disk may have a thickness of approximately 0.025 inch. Step 43 can have a slightly lesser thickness of about 0.023 inch to permit slight compressions of disk 49 and disk 50 by pad 57.

The pressure force on disks 49 and 50 is preferably about 300 psi, although a range of pressures can be used as noted in the above-referenced patent application, Ser. No. 741,929. The action of pressure pad 57 is such that initially the pad forces disk 50 against sealing surface 47, causing a slight reduction in the thickness of disk 50. At the same time, disk 50 transmits pressure and force to disk 49.

Because disk 49 is slightly thicker than the axial dimension of step 43, disk 49 can experience a slight thickness reduction while still being able to receive the pressure from disk 50. Each disk will be in pressure contact with its respective metal sealing surface 45 or 47.

Induction heater coil 53 is preferably a thick flat coil having a single turn. As shown in FIG. 4, the coil may have a dielectric coating 61 thereon. Also, a coolant passage 62 may extend through the coil. The coil is dimensioned so that its outer diameter is approximately the same as the outer diameter of PTFE disk 50.

When the coil is electrically energized, a magnetic field is induced around the coil as denoted by the dashed line 63 in FIG. 4. The magnetic field passes through radial metal wall 41 to heat the metal sealing surfaces 45 and 47 by eddy current action. In one embodiment, wall 41 may have a thickness of about 0.035 inch.

The magnetic flux path 63 is confined to radial wall 41. There is no direct heating of case wall 39, although wall 39 may be heated slightly by conduction through the metal material. The heating of wall 41 is controlled by regulating the current flow through induction coil 53. The heating of wall 41 is such that the temperature on sealing surfaces 45 and 47 is elevated to about 700° F.

Such a temperature is sufficient to gel the contacted surfaces of disks 49 and 50 so as to produce a strong adhesive bond between the disks and the metal surfaces. However, the high temperature condition should not be maintained for a prolonged period of time, as each disk 49 or 50 could then melt or gel through its entire thickness rather than a localized melting along the disk-metal interface.

Excessive heating of the PTFE can produce irreversible disruptions and changes in its molecular chains resulting in poor seal performance. Preferably, induction heater coil 53 is energized for a relatively short period of time, on the order of thirty seconds or less, whereby metal surfaces 45 and 47 are at approximately 700° F. for about twenty seconds. A period of about ten seconds is initially required to raise the metal surfaces into the 700° F. range.

Obviously, numerous modifications and variations of the present invention are possible in the light of the above teachings. It is therefore to be understood that within the scope of the appended claims, the invention may be practiced otherwise than as specifically described herein. For example, the induction coil 53 need not directly contact the metal case 37 but may be located adjacent the metal case which may be supported above the coil by a spacer supported on support surface 55. Moreover, the shape of the sealing disks need not be limited to circular outer profiles, as any suitable profile may be used.

I claim:

1. A dual lip seal, comprising:

an annular case that includes a radial wall having an axial step defining a radially outer mounting surface and a radially inner mounting surface respectively located in first and second axially-spaced radially-extending planes, said inner and outer mounting surfaces being defined on the same side of said radial wall;

a first sealing disk seated on and bonded to said inner mounting surface; and a second sealing disk seated on and bonded to said outer mounting surface such that said second disk extends radially outwardly beyond said axial step.

2. The dual lip seal of claim 1, wherein each sealing disk is formed of PTFE.

3. The dual lip seal of claim 2, wherein said first sealing disk comprises a first filler dispersed therein, and said second sealing disk comprises a second filler dispersed therein.

4. The dual lip seal of claim 2, wherein said first and second sealing disks each comprises finely divided filler materials dispersed therein, the filler materials in the first disk being different than the filler materials in the second disk.

5. The dual lip seal of claim 2, wherein the axial step in the radial wall has an axial dimension no greater than the thickness of the first sealing disk, whereby said second sealing disk has a surface portion thereof in facial contact with said first sealing disk.

6. The dual lip seal of claim 2, wherein each sealing disk has the same thickness.

* * * * *

UNITED STATES PATENT AND TRADEMARK OFFICE
CERTIFICATE OF CORRECTION

PATENT NO. : 5,209,502
DATED : May 11, 1993
INVENTOR(S) : Michael A. Savoia

It is certified that error appears in the above-indentified patent and that said Letters Patent is hereby corrected as shown below:

Column 3, line 3, "3" should read --33--

Signed and Sealed this

Fourteenth Day of December, 1993

Attest:

BRUCE LEHMAN

*Attesting Officer*   *Commissioner of Patents and Trademarks*